US010575343B2

(12) United States Patent
Liu et al.

(10) Patent No.: US 10,575,343 B2
(45) Date of Patent: Feb. 25, 2020

(54) COMMUNICATION METHOD AND APPARATUS

(71) Applicant: Huawei Technologies Co., Ltd., Shenzhen (CN)

(72) Inventors: Jing Liu, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 15/459,271

(22) Filed: Mar. 15, 2017

(65) Prior Publication Data

US 2017/0188289 A1 Jun. 29, 2017

Related U.S. Application Data

(63) Continuation of application No. PCT/CN2014/086636, filed on Sep. 16, 2014.

(51) Int. Cl.
*H04W 40/12* (2009.01)
*H04W 76/10* (2018.01)
(Continued)

(52) U.S. Cl.
CPC ............ *H04W 76/10* (2018.02); *H04L 45/20* (2013.01); *H04L 65/1016* (2013.01);
(Continued)

(58) Field of Classification Search
CPC ..................... H04W 10/12; H04L 65/1016
See application file for complete search history.

(56) References Cited

U.S. PATENT DOCUMENTS 9,173,141 B2 * 10/2015 Cai .................. H04W 36/0083
2002/0173310 A1 11/2002 Ebata et al.
(Continued)

FOREIGN PATENT DOCUMENTS

CA 2860741 A1 7/2013
CN 1414804 A 4/2003
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300, V11.5.0, Mar. 2013, 209 pages.
(Continued)

Primary Examiner — Zhiren Qin
(74) Attorney, Agent, or Firm — Slater Matsil, LLP

(57) ABSTRACT

The present embodiments disclose a communication method and apparatus, and pertain to the field of communication technologies. The method includes receiving, by a first base station, a second base station identity sent by a first mobility management entity MME, and establishing a transmission channel between the first base station and a second base station corresponding to the second base station identity. The method also includes receiving, by the first base station, data that a first terminal sends to a second terminal and sending, by the first base station, the data to the second base station over the transmission channel, so that the second base station sends the data to the second terminal.

19 Claims, 5 Drawing Sheets

(51) Int. Cl.
*H04W 76/11* (2018.01)
*H04L 12/733* (2013.01)
*H04L 29/06* (2006.01)
*H04W 8/06* (2009.01)
*H04W 48/10* (2009.01)
*H04W 88/08* (2009.01)

(52) U.S. Cl.
CPC ............. *H04W 8/06* (2013.01); *H04W 40/12* (2013.01); *H04W 48/10* (2013.01); *H04W 76/11* (2018.02); *H04W 88/08* (2013.01)

(56) References Cited

U.S. PATENT DOCUMENTS

| | | | |
|---|---|---|---|
| 2010/0177753 | A1 | 7/2010 | Bahr |
| 2010/0202458 | A1 | 8/2010 | Sato |
| 2012/0015683 | A1* | 1/2012 | Gao ................ H04W 8/26 455/524 |
| 2013/0088983 | A1* | 4/2013 | Pragada ............ H04W 16/14 370/252 |
| 2014/0213249 | A1* | 7/2014 | Kang ................ H04W 28/18 455/434 |
| 2015/0023323 | A1* | 1/2015 | Morita .............. H04W 36/08 370/334 |
| 2015/0156336 | A1 | 6/2015 | Tamura et al. |
| 2015/0382385 | A1* | 12/2015 | Cai .................. H04W 76/11 370/254 |
| 2016/0050652 | A1* | 2/2016 | Wu ................... H04L 5/001 370/329 |
| 2016/0088617 | A1* | 3/2016 | Goldhamer ........... H04L 1/18 370/330 |
| 2016/0105920 | A1* | 4/2016 | Huang ............... H04W 24/02 370/328 |
| 2016/0345307 | A1* | 11/2016 | Huang ............. H04W 52/0216 |
| 2017/0019833 | A1* | 1/2017 | Luo .................. H04W 40/24 |

FOREIGN PATENT DOCUMENTS

| | | |
|---|---|---|
| CN | 101400153 A | 4/2009 |
| CN | 101843054 A | 9/2010 |
| CN | 102045871 A | 5/2011 |
| CN | 102123423 A | 7/2011 |
| CN | 102711217 A | 10/2012 |
| CN | 103313321 A | 9/2013 |
| JP | 2002345018 A | 11/2002 |
| JP | 2006203324 A | 8/2006 |
| JP | 2010531591 A | 9/2010 |
| JP | 2014003383 A | 1/2014 |
| WO | 2013004793 A1 | 1/2013 |
| WO | WO-2013033907 A1 * | 3/2013 ........ H04W 72/1215 |
| WO | 2013066074 A1 | 5/2013 |

OTHER PUBLICATIONS

"3rd Generation Partnership Project; Technical Specification Group Radio Access Network; Evolved Universal Terrestrial Radio Access Network (E-UTRAN); X2 general aspects and principles (Release 12)", 3GPP TS 36.420, V12.0.0, Jun. 2014, 12 pages.

"3rd Generation Partnership Project; Technical Specification Group Radio Access Network; Evolved Universal Terrestrial Radio Access Network(E-UTRAN); X2 data transport (Release 12)", 3GPP TS 36.424, V12.0.0, Mar. 2014, 8 pages.

* cited by examiner

COMMUNICATION METHOD AND APPARATUS

CROSS-REFERENCE TO RELATED APPLICATIONS

This application is a continuation of International Application No. PCT/CN2014/086636, filed on Sep. 16, 2014, the disclosure of which is hereby incorporated by reference in its entirety.

TECHNICAL FIELD

The present embodiments relate to the field of communication technologies, and in particular, to a communication method and apparatus.

BACKGROUND

A Long Term Evolution (LTE) system architecture mainly includes an access network and a core network. The access network mainly includes a base station, and the core network mainly includes a mobility management entity (MME), a serving gateway (S-GW), and a packet data network gateway (P-GW). Wireless communication between terminals can be implemented by using the LTE system architecture.

As shown in FIG. 1, when a user initiates communication with a target user, the user may use a first terminal to send a communication request to an IMS (Internet Protocol Multimedia Subsystem) by using a first base station, a first S-GW (an S-GW to which a first MME belongs), and a first P-GW (a P-GW to which the first S-GW belongs). The IMS parses the communication request and learns that a communication target is a second terminal. Then, the IMS sends a command instruction to a second PCRF (policy and charging rules function) (a PCRF to which a second P-GW belongs), and requires the PCRF to trigger bearer setup of a corresponding service, so as to establish a dedicated data transmission channel from the second P-GW (a P-GW that provides a service for the second terminal) to a second S-GW (an S-GW that provides a service for the second terminal), from the second S-GW to a second base station (a base station to which the second terminal is attached), and from the second base station to the second terminal. At the same time, the IMS further sends a command instruction to a first PCRF (a PCRF to which the first P-GW belongs), and requires the PCRF to trigger bearer setup of a corresponding service, so as to establish a dedicated data transmission channel from the first P-GW (a P-GW that provides a service for the first terminal) to the first S-GW (an S-GW that provides a service for the first terminal), from the first S-GW to the first base station (a base station to which the first terminal is attached), and from the first base station to the first terminal. The dedicated data transmission channel is used to transmit communication data exchanged between the first terminal and the second terminal.

In a process of implementing the present invention, the inventor finds that at least the following problems exist in the prior art.

Generally, when the two terminals communicate with each other by using the foregoing method, communication data can be transmitted to the second terminal only after passing through the first base station, the first S-GW, the first P-GW, the IMS, the second P-GW, and the second S-GW. Therefore, there is a relatively long communication delay between the terminals.

SUMMARY

To resolve a prior-art problem, embodiments of the present invention provide a communication method and apparatus. Technical solutions are as follows.

According to a first aspect, a communication method is provided, where the method includes receiving, by a first base station, a second base station identity sent by a first mobility management entity (MME), and establishing a transmission channel between the first base station and a second base station corresponding to the second base station identity. The method also includes receiving, by the first base station, data to be sent from the first terminal to a second terminal; and sending, by the first base station, the data to the second base station over the transmission channel, so that the second base station sends the data to the second terminal.

With reference to the first aspect, in a first possible implementation manner of the first aspect, the establishing a transmission channel between the first base station and a second base station corresponding to the second base station identity includes: broadcasting, by the first base station, a path detection message that carries the second base station identity to a neighboring base station; receiving, by the first base station, a response message sent by the neighboring base station, and determining a transmission path to the second base station according to the response message, where the response message carries link quality information of a channel and/or information about a total hop count of a link from the first base station to the second base station; and establishing, by the first base station, the transmission channel between the first base station and the second base station based on the determined transmission path.

With reference to the first aspect, in a second possible implementation manner of the first aspect, the transmission channel is a public transmission channel or a dedicated transmission channel; the sending, by the first base station, the data to the second base station over the transmission channel, so that the second base station sends the data to the second terminal includes: if the transmission channel is a public transmission channel, sending, by the first base station, the data to the second base station over the transmission channel, so that the second base station sends the data to the second terminal; or if the transmission channel is a dedicated transmission channel, obtaining, by the first base station, a channel identifier of the transmission channel, and sending the data to the second base station over the transmission channel corresponding to the channel identifier, so that the second base station sends the data to the second terminal.

According to a second aspect, a communication method is provided, where the method includes obtaining, by a first MME, a second base station identity of a second base station that provides a service for a second terminal. The method also includes sending, by the first MME, the second base station identity to a first base station, so that the first base station establishes a transmission channel between the first base station and the second base station corresponding to the second base station identity, where the transmission channel is used by the first base station to send data to the second base station when receiving the data to be sent from the first terminal to the second terminal, so that the second base station sends the data to the second terminal.

With reference to the second aspect, in a first possible implementation manner of the second aspect, the obtaining, by a first MME, a second base station identity of a second base station that provides a service for a second terminal includes: receiving, by the first MME, second base station identity information that is sent, by using an Internet Protocol Multimedia Subsystem (IMS) server, by a second MME that provides a service for the second terminal.

With reference to the second aspect, in a second possible implementation manner of the second aspect, the obtaining, by a first MME, a second base station identity of a second base station that provides a service for a second terminal includes: receiving, by the first MME, globally unique temporary identity (GUTI) information that is sent, by using an IMS server, by a second MME that provides a service for the second terminal, and sending an information obtaining request to the second MME corresponding to the GUTI information; and receiving, by the first MME, second base station identity information sent by the second MME.

According to a third aspect, a base station is provided, where the base station includes: a receiving module, configured to receive second base station identity information sent by a first mobility management entity (MME); an establishment module, configured to establish a transmission channel between the base station and a second base station corresponding to the second base station identity; where the receiving module is further configured to receive data to be sent from the first terminal to a second terminal; and a sending module, configured to send the data to the second base station over the transmission channel, so that the second base station sends the data to the second terminal.

With reference to the third aspect, in a first possible implementation manner of the third aspect, the sending module is further configured to broadcast a path detection message that carries the second base station identity to a neighboring base station; the receiving module is further configured to receive a response message sent by the neighboring base station, and determine a transmission path to the second base station according to the response message, where the response message carries link quality information of a channel and/or information about a total hop count of a link from the first base station to the second base station; and the establishment module is specifically configured to establish the transmission channel between the base station and the second base station based on the determined transmission path.

With reference to the third aspect, in a second possible implementation manner of the third aspect, the transmission channel is a public transmission channel or a dedicated transmission channel; the sending module is specifically configured to: if the transmission channel is a public transmission channel, send the data to the second base station over the transmission channel, so that the second base station sends the data to the second terminal; or if the transmission channel is a dedicated transmission channel, obtain a channel identifier of the transmission channel, and send the data to the second base station over the transmission channel corresponding to the channel identifier, so that the second base station sends the data to the second terminal.

According to a fourth aspect, an MME is provided, where the MME includes: an obtaining module, configured to obtain a second base station identity of a second base station that provides a service for a second terminal; and a sending module, configured to send the second base station identity to a first base station, so that the first base station establishes a transmission channel between the first base station and the second base station corresponding to the second base station identity, where the transmission channel is used by the first base station to send data to the second base station when receiving the data to be sent from the first terminal to the second terminal.

With reference to the fourth aspect, in a first possible implementation manner of the fourth aspect, the MME further includes a receiving module, configured to receive second base station identity information that is sent, by using an IMS server, by a second MME that provides a service for the second terminal; and the obtaining module is specifically configured to obtain the second base station identity from the second base station identity information.

With reference to the fourth aspect, in a second possible implementation manner of the fourth aspect, the MME further includes a receiving module, configured to receive GUTI information that is sent, by using an IMS server, by a second MME that provides a service for the second terminal; the sending module is further configured to send an information obtaining request to the second MME corresponding to the GUTI information; the receiving module is further configured to receive second base station identity information sent by the second MME; and the obtaining module is specifically configured to obtain the second base station identity from the second base station identity information.

The technical solutions provided in the embodiments of the present invention bring the following beneficial effects:

In the embodiments of the present invention, when receiving a second base station identity sent by a first MME, a first base station establishes a transmission channel between the first base station and a second base station. When receiving data sent by a first terminal, the first base station may directly transmit the data to a second terminal over the transmission channel, and does not need to transmit the data by using a core network (serving gateway (S-GW) and packet gateway (P-GW)) anymore. Therefore, Delay impact on communication between terminals is reduced.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings.

Embodiment 1

Figure 1:
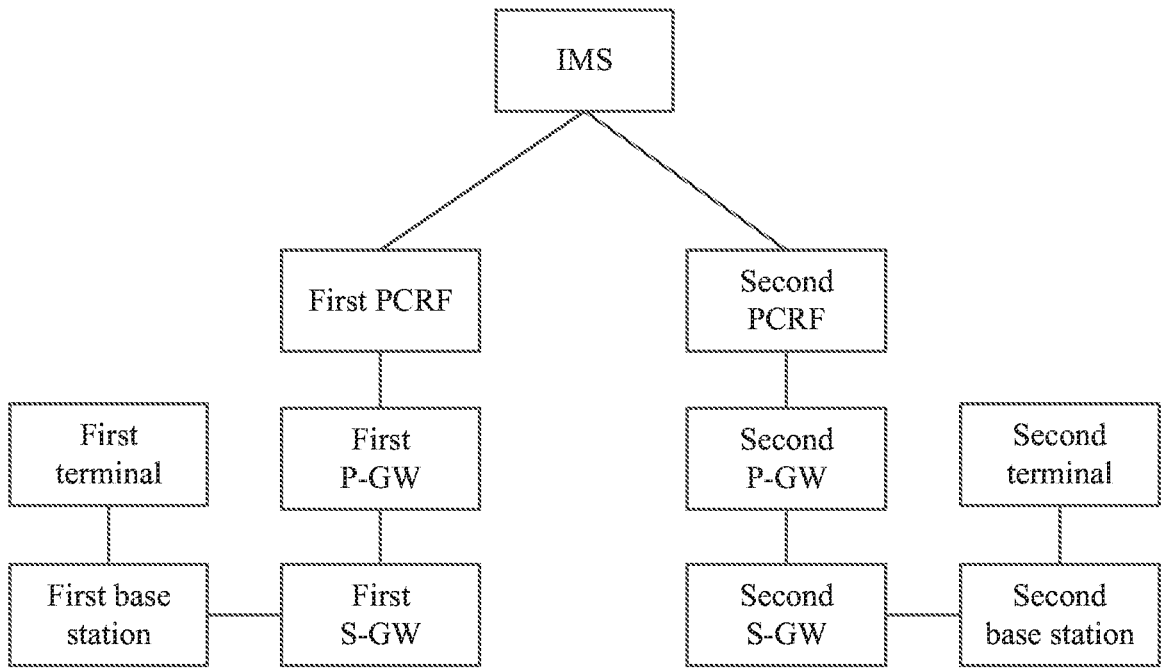
FIG. 1 is a flowchart of a communication method according to an embodiment of the present invention.
Figure 2:
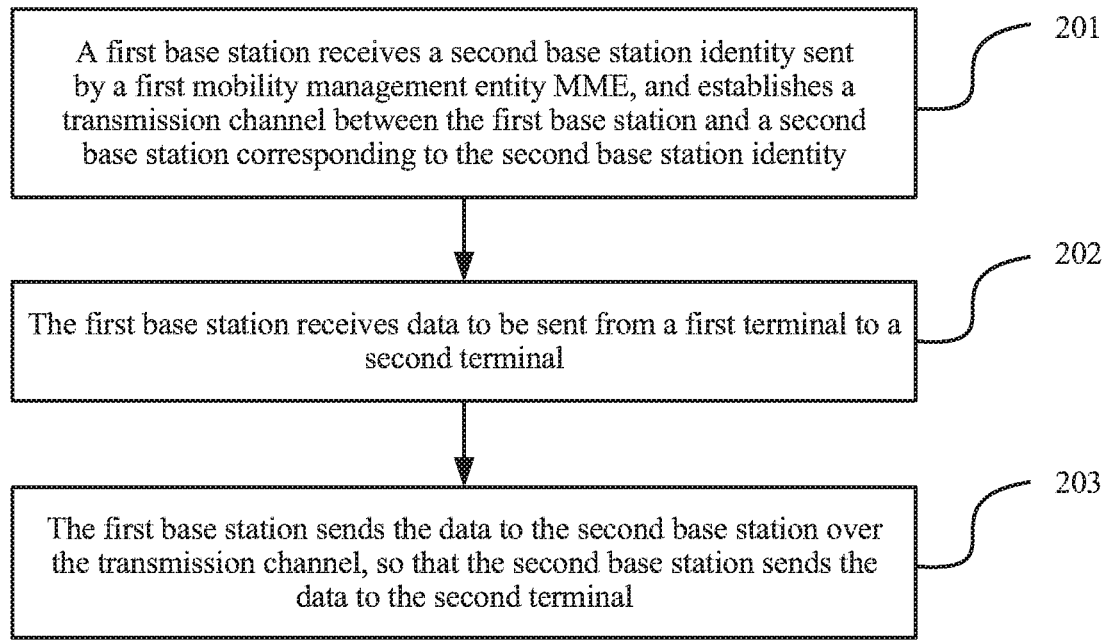
FIG. 2 is a flowchart of a communication method according to an embodiment of the present invention.

This embodiment of the present invention provides a communication method. As shown in FIG. 2, the method may be executed by a first base station. The first base station is a base station that provides a service for a first terminal. A processing procedure of the method may include the following steps.

Step 201: The first base station receives a second base station identity sent by a first MME, and establishes a transmission channel between the first base station and a second base station corresponding to the second base station identity.

Optionally, in this embodiment of the present invention, the first base station may receive a communication request sent by the first terminal, and send the communication request to an Internet Protocol Multimedia Subsystem (IMS) server.

The IMS refers to an internet protocol (IP) multimedia subsystem that uses SIP (Session Initiation Protocol) as signaling for call control and service control, and is mainly used in session control. The first terminal may be any terminal that has a wireless communication function, for example, a cell phone.

During implementation, for example, the first terminal performs VOIP (Voice over Internet Protocol) service communication with a second terminal. A user may make an IP call by using the first terminal, and the user enters a second terminal identity of the second terminal. For example, the second terminal is a cell phone, and the second terminal identity may be a cell phone number. After the number is dialed, the first terminal obtains the second terminal identity entered by the user, and generates a communication request. The first terminal sends the communication request to the IMS server, and the communication request carries the second terminal identity information and a communication service type. The IMS server parses the communication request, identifies that a communication target is the second terminal, and triggers establishment of a transmission channel from a core network to the second terminal, and establishment of a transmission channel from the core network to the first terminal. The transmission channels are used to transmit data exchanged between the first terminal and the second terminal.

During implementation, after receiving the second base station identity, the first base station initiates a routing discovery mechanism, and determines a transmission path to the second base station corresponding to the second base station identity. The foregoing process is specifically as follows: The first base station sends a broadcast message that carries the second base station identity; when a receiving base station discovers that the second base station identity carried in the broadcast message indicates the receiving base station itself or a neighboring base station of the receiving base station, the receiving base station returns a response message to the first base station. The response message carries an identity of the receiving base station, and quality of a link to the second base station and/or a quantity of base stations that the link passes through, so that the first base station selects a transmission path. The first base station determines the transmission path to the second base station according to the received response message, and establishes, on the transmission path, the transmission channel between the first base station and the second base station.

A neighboring base station is a base station whose distance from another base station is within a preset distance range. The base station may pre-record a base station identity of its neighboring base station.

Optionally, after receiving the second base station identity sent by the first MME, the first base station determines whether a neighboring base station of the first base station includes the second base station corresponding to the second base station identity. If the neighboring base station of the first base station includes the second base station, the first base station may establish a directly connected transmission path to the second base station, so as to establish a direct transmission channel between the first base station and the second base station. Correspondingly, a processing procedure of establishing a transmission channel between the first base station and a second base station corresponding to the second base station identity in the foregoing step 201 may include the following steps.

Step 1: The first base station sends a channel establishment request to the second base station.

The channel establishment request carries a transport layer channel identifier allocated by the first base station, such as an IP address and a channel port number.

Step 2: When receiving a channel establishment response sent by the second base station, the first base station establishes the transmission channel between the first base station and the second base station corresponding to the second base station identity.

The channel establishment response carries a transport layer channel identifier allocated by the second base station, such as an IP address and a channel port number.

During implementation, when receiving the channel establishment request, the second base station may allocate a transport layer channel identifier for a service (such as a communication service or a network data service) that needs to be performed by the first terminal and the second terminal, and send the channel identifier to the first base station by using the channel establishment response. After receiving the channel establishment response, the first base station may perform data transmission to the second base station according to the obtained transport layer channel identifier allocated by the second base station.

Optionally, if the first base station and the second base station are not neighboring base stations, a multi-hop manner may be further used. That is, a neighboring base station searches for the second base station, and a transmission channel between the first base station and the second base station is established based on a searched transmission path. Correspondingly, a processing procedure of establishing a transmission channel between the first base station and a second base station corresponding to the second base station identity in the foregoing step 201 may include the following steps.

Step 1: The first base station broadcasts a path detection message that carries the second base station identity to a neighboring base station.

During implementation, each base station records a base station identity of a neighboring base station of the base station. When receiving second base station identity information, the first base station broadcasts the path detection message that carries the second base station identity to surrounding neighboring base stations.

Step 2: The first base station receives a response message sent by the neighboring base station, and determines a transmission path to the second base station according to the response message.

The response message may carry one or more pieces of the following information, for example, link quality information of a channel and/or information about a total hop count of a link from the first base station to the second base station. The link quality information of a channel may include signal strength, a signal-to-noise ratio of a channel, and the like, and the information about a total hop count may include a quantity of base stations that a signal sent by the first base station to the second base station passes through, and the like.

During implementation, when each neighboring base station receives the path detection message, if the neighboring base station discovers that the second base station is not the neighboring base station itself or its surrounding neighboring base station, the neighboring base station continues to broadcast the path detection message to surrounding base stations, until one base station discovers that the second base station is the base station itself or its surrounding neighboring base station. In this case, the foregoing manner in step 2 is still used, and a response message is returned to the first base station. The first base station determines the transmission path to the second base station according to the received response message. For example, a transmission path whose channel signal strength is the strongest and on which the total hop count of the link from the first base station to the second base station is the least may be used as the transmission path to the second base station.

Step 3: The first base station establishes the transmission channel between the first base station and the second base station based on the determined transmission path.

During implementation, the first base station may determine a base station identity of a neighboring base station on the transmission path, and sends a channel establishment request to the second base station by using the neighboring base station. After receiving the channel establishment request, the second base station allocates a transport layer channel identifier and returns the channel identifier to the neighboring base station by using a response message. After receiving the transport layer channel identifier allocated by the second base station, the neighboring base station establishes a transmission channel from the neighboring base station to the second base station, allocates a transport layer channel identifier of the neighboring base station itself, and returns the channel identifier to the first base station by using a response message. After receiving the transport layer channel identifier allocated by the neighboring base station, the first base station establishes a transmission channel from the first base station to the neighboring base station, thereby achieving an objective of establishing the transmission channel between the first base station and the second base station on the transmission path.

Optionally, a processing procedure of the foregoing step 3 that the first base station establishes the transmission channel between the first base station and the second base station based on the determined transmission path may include the following steps:

Step 1: The first base station sends a channel establishment request to the second base station over the determined transmission path.

Step 2: When receiving a channel establishment response sent by a third base station, the first base station establishes the transmission channel between the first base station and the second base station based on the determined transmission path.

The third base station is a neighboring base station that is recorded in the first base station and on the transmission path.

For processing procedures of the foregoing step 1 and step 2, reference may be made to the foregoing related content and prior-art solutions; details are not repeatedly described herein.

The established transmission channel between the first base station and the second base station corresponding to the second base station identity in the foregoing step 201 may be of various types. The following provides two types of transmission channels that can be established between the first base station and the second base station, which may include.

Type 1: The first base station establishes a public transmission channel with the second base station. That is, services that are of same QoS (Quality of Service) and of different terminals may be transmitted on the public transmission channel. To help the second base station to further identify that data being transmitted on the public transmission channel belongs to which target terminal, the current GTP (General Data Transfer Platform) Protocol needs to be modified, that is, the second terminal identity of the second terminal is added to a GTP header field.

Type 2: The first base station establishes a dedicated transmission channel with the second base station. That is, only data of a specified service of a corresponding terminal can be transmitted on this dedicated transmission channel. Therefore, the second base station needs to allocate different channel identities for different services of different terminals, and sends the channel identifier to the first base station. For example, the second base station may send the channel identifier to the first base station in a process that the first terminal initiates a service request; or, the first base station may directly send a request to the second base station after obtaining the second base station identity, and the second base station sends the channel identifier to the first base station by using a response message.

Optionally, a triggering condition may be set for a process of establishing the transmission channel between the first base station and the second base station, for example, the first MME sends the second base station identity to the first base station, so as to trigger the first base station to execute the process of establishing the transmission channel between the first base station and the second base station.

Step 202: The first base station receives data to be sent from the first terminal to a second terminal.

During implementation, the first terminal may receive data entered by a user, and send the received data to the first base station. The first base station may receive the data.

Step 203: The first base station sends the data to the second base station over the transmission channel, so that the second base station sends the data to the second terminal.

During implementation, when the first base station receives the data that the first terminal sends to the second terminal, the first base station may send the data to the second base station over the transmission channel established on the determined transmission path. When receiving the data, the second base station sends the data to the second terminal, and a target user can obtain the data from the second terminal.

Optionally, if the transmission channel is a public transmission channel, the first base station receives data that carries the second terminal identity and that is sent by the first terminal, and sends the data to the second base station over the determined transmission channel, so that the second base station sends the data to the second terminal corresponding to the second terminal identity. If the transmission channel is a dedicated transmission channel, the first base station obtains a channel identifier, where the channel identifier is used by the first base station to send data to the second base station over the transmission channel corresponding to the channel identifier when receiving the data to be sent from the first terminal to the second terminal, so that the second base station sends the communication data to the second terminal.

In this embodiment of the present invention, when receiving a second base station identity sent by a first MME, a first base station establishes a transmission channel between the first base station and a second base station. When receiving data sent by a first terminal, the first base station may directly transmit the data to a second terminal over the transmission channel, and does not need to transmit the data by using a core network (S-GW and P-GW) anymore. Therefore, Delay impact on communication between terminals is reduced.

Embodiment 2

Figure 3:
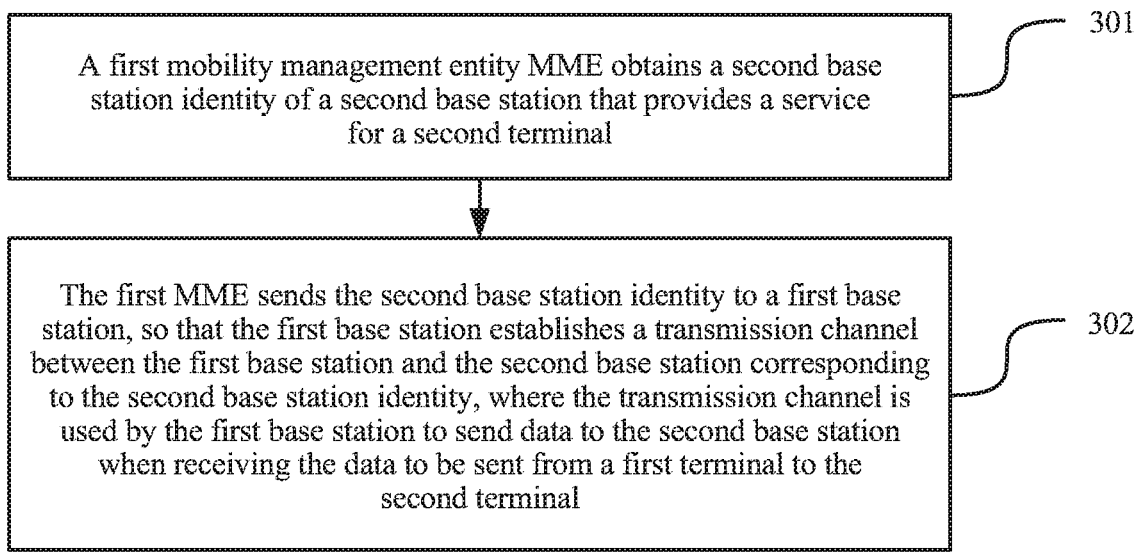
FIG. 3 is a flowchart of a communication method according to an embodiment of the present invention.

This embodiment of the present invention provides a communication method. As shown in FIG. 3, the method may be executed by a first MME. The first MME is an MME that provides a service for a first terminal, and a first base station is a base station that provides a service for the first terminal. A processing procedure of the method may include the following steps.

Step 301: The first MME obtains a second base station identity of a second base station that provides a service for a second terminal.

The second base station is a base station that provides a service for the second terminal, and the second base station identity may be a base station ID (identity) of the second base station.

During implementation, the prior art is still used. The first terminal sends a communication request to an IMS server. The IMS server parses the communication request, identifies that a communication target is the second terminal, and triggers establishment of a data transmission channel from a core network to the second terminal, and establishment of a data transmission channel from the core network to the first terminal. In a process of establishing a target data transmission channel from the core network to the second terminal, an MME that provides a service for the second terminal may obtain related information of the second terminal, for example, identity information of the second base station that provides a service to the second terminal, or identity information GUTI that the second base station allocates to the second terminal. Therefore, in this embodiment, the MME that provides a service for the second terminal needs to further forward the obtained related information of the second terminal to the first MME by using the IMS server.

Optionally, there may be various processing manners in which the first MME obtains the second base station identity. The following provides two optional processing manners, which may include.

Manner 1: The first MME receives the second base station identity information that is sent, by using the IMS server, by the second MME that provides a service for the second terminal.

During implementation, the MME that provides a service for the second terminal directly forwards, to the first MME by using the IMS server, the identity information of the second base station that provides a service for the second terminal.

Manner 2: The first MME receives globally unique temporary identity (GUTI) information that is sent, by using the IMS server, by the second MME that provides a service for the second terminal, and sends an information obtaining request to the second MME corresponding to the GUTI information; and receives the second base station identity information sent by the second MME.

During implementation, the MME that provides a service for the second terminal forwards, to the first MME by using the IMS server, an identity GUTI that the MME allocates to the second terminal. When receiving the GUTI information, the first MME may obtain, by parsing the identity, information about the MME that provides a service for the second terminal, and request the MME to provide the identity information of the second base station that provides a service for the second terminal.

Step 302: The first MME sends the second base station identity to the first base station, so that the first base station establishes a transmission channel between the first base station and the second base station corresponding to the second base station identity, where the transmission channel is used by the first base station to send data to the second base station when receiving the data to be sent from the first terminal to the second terminal.

During implementation, first, the first MME needs to determine whether the first terminal can directly communicate with the second terminal, that is, whether communication data between the first terminal and the second terminal needs to be forwarded by using the core network (S-GW and P-GW). If the data needs to be forwarded by using the core network, a current long term evolution (LTE) mechanism is still used to perform processing. A specific processing procedure is not repeatedly described herein. If the data does not need to be forwarded by using the core network, the second base station identity may be sent to the first base station. When receiving the second base station identity, the first base station may establish the transmission channel between the first base station and the second base station corresponding to the second base station identity. For a process of establishing the transmission channel between the first base station and the second base station, reference may be made to related content in Embodiment 1; details are not repeatedly described herein.

The first MME may determine, by using multiple methods, whether the first terminal can directly communicate with the second terminal, that is, whether the communication data between the first terminal and the second terminal needs to be forwarded by using the core network. For example, if the MME that provides a service for the first terminal is the same as the MME that provides a service for the second terminal, the first terminal can directly communicate with the second terminal; otherwise, the data needs to be forwarded by using the core network. For another example, a distance between the first base station and the second base station may be obtained by using some preset algorithms. When the distance is less than a preset threshold, the data between the first terminal and the second terminal does not need to be forwarded by using the core network; otherwise, the data needs to be forwarded by using the core network.

In this embodiment of the present invention, a first MME may obtain a second base station identity of a second base station that provides a service for a second terminal, and sends the second base station identity to a first base station. Therefore, when receiving the second base station identity sent by the first MME, the first base station establishes a transmission channel between the first base station and the second base station. When receiving data sent by a first terminal, the first base station may directly transmit the data to the second terminal over the transmission channel, and does not need to transmit the data by using a core network (S-GW and P-GW) anymore. Therefore, Delay impact on communication between terminals is reduced.

Embodiment 3

This embodiment of the present invention provides a communication method, where the method may be implemented together by a first MME and a first base station. The first base station may be a base station that provides a service for a first terminal, the first MME may be an MME that provides a service for the first terminal, and the first terminal may be a terminal used by a user who initiates communication with a target user.

Figure 4:
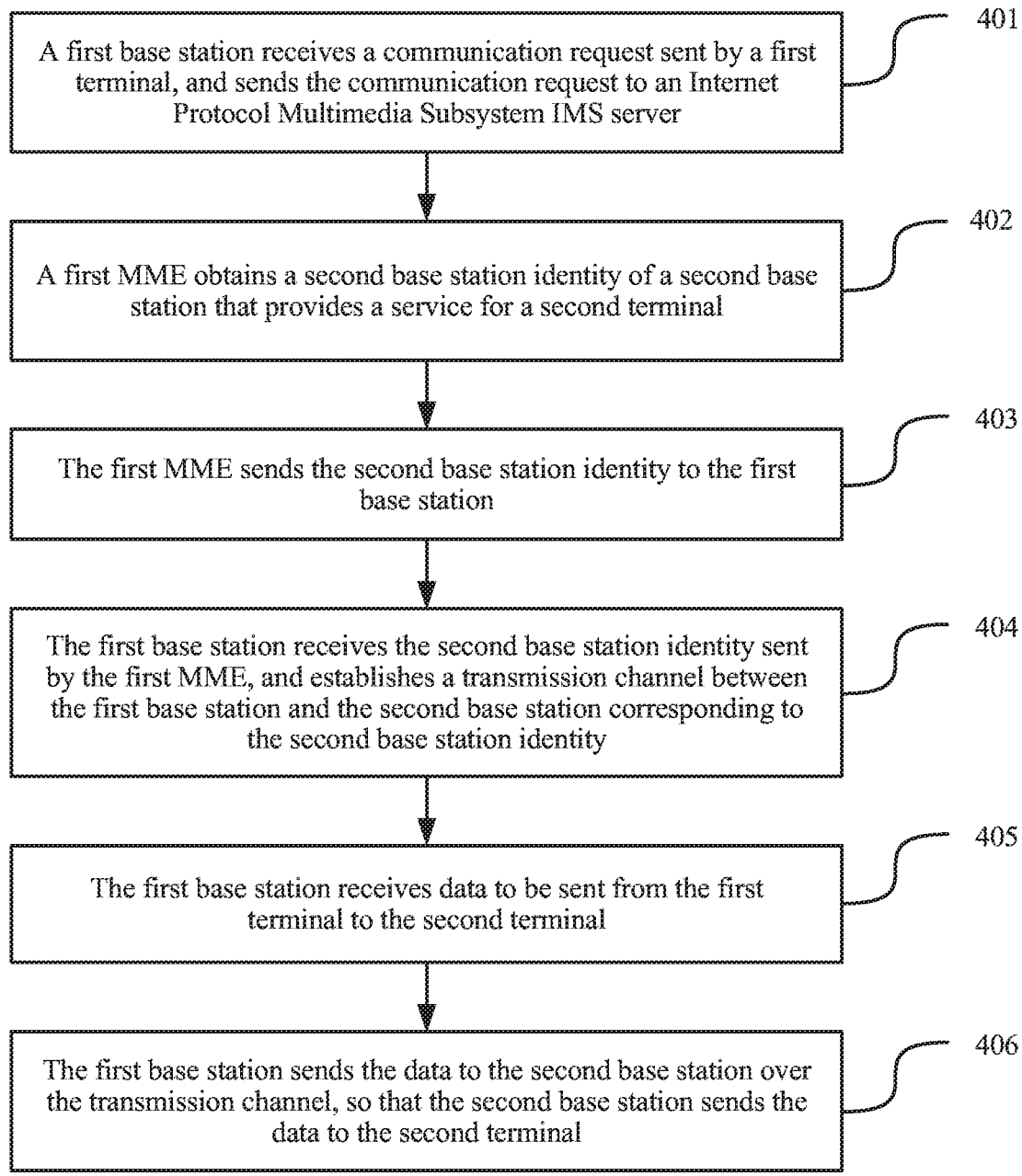
FIG. 4 is a flowchart of a communication method according to an embodiment of the present invention.

As shown in FIG. 4, a processing procedure of the method may include the following steps.

Step 401: The first base station receives a communication request sent by the first terminal, and sends the communication request to an Internet Protocol Multimedia Subsystem (IMS) server.

Step 402: The first MME obtains a second base station identity of a second base station that provides a service for a second terminal.

Step 403: The first MME sends the second base station identity to the first base station.

During implementation, if the first MME determines that communication data between the first terminal and the second terminal does not need to be forwarded by using a core network, the first MME may send the second base station identity to the first base station. If the first MME determines that the communication data between the first terminal and the second terminal needs to be forwarded by using the core network, a current LTE mechanism may be still used to perform processing.

Step 404: The first base station receives the second base station identity sent by the first MME, and establishes a transmission channel between the first base station and the second base station corresponding to the second base station identity.

Step 405: The first base station receives data to be sent from the first terminal to the second terminal.

Step 406: The first base station sends the data to the second base station over the transmission channel, so that the second base station sends the data to the second terminal.

For a specific implementation process of the foregoing step 401 to step 406, reference may be made to related content of the foregoing Embodiment 1 and Embodiment 2; details are not repeatedly described herein.

In this embodiment of the present invention, a first MME may obtain a second base station identity of a second base station that provides a service for a second terminal, and sends the second base station identity to a first base station. Therefore, when receiving the second base station identity sent by the first MME, the first base station establishes a transmission channel between the first base station and the second base station. When receiving data sent by a first terminal, the first base station may directly transmit the data to the second terminal over the transmission channel, and does not need to transmit the data by using a core network (S-GW and P-GW) anymore. Therefore, Delay impact on communication between terminals is reduced.

Embodiment 4

This embodiment of the present invention further provides a base station, where the base station is configured to execute operations of the first base station in Embodiment 1.

Figure 5:
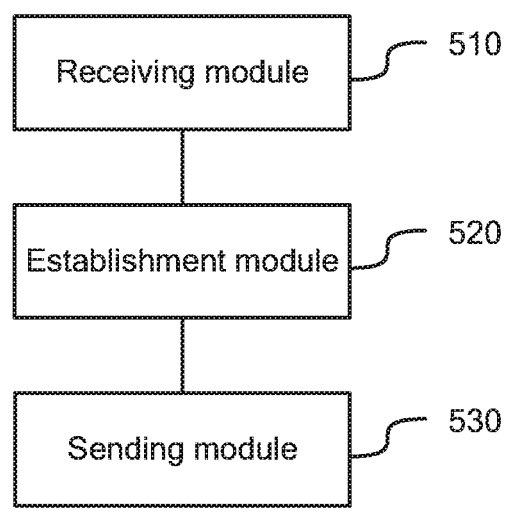
FIG. 5 is a schematic structural diagram of a base station according to an embodiment of the present invention.

As shown in FIG. 5, the base station includes: a receiving module 510, configured to receive second base station identity information sent by a first MME; an establishment module 520, configured to establish a data transmission channel between the base station and a second base station corresponding to a second base station identity in the second base station identity information; where the receiving module 510 is further configured to receive data to be sent from a first terminal to a second terminal; and a sending module 530, configured to send the data to the second base station over the transmission channel, so that the second base station sends the data to the second terminal.

Optionally, the sending module 530 is further configured to broadcast a path detection message that carries the second base station identity to a neighboring base station; the receiving module 510 is further configured to receive a response message sent by the neighboring base station, and determine a transmission path to the second base station according to the response message, where the response message carries link quality information of a channel and/or information about a total hop count of a link from the first base station to the second base station; and the establishment module 520 is specifically configured to establish the transmission channel between the base station and the second base station based on the determined transmission path.

Optionally, the transmission channel is a public transmission channel or a dedicated transmission channel.

The sending module 530 is specifically configured to: if the transmission channel is a public transmission channel, send the data to the second base station over the transmission channel, so that the second base station sends the data to the second terminal corresponding to a second terminal identity; or if the transmission channel is a dedicated transmission channel, obtain a channel identifier of the transmission channel, and send the data to the second base station over the transmission channel corresponding to the channel identifier, so that the second base station sends the data to the second terminal.

Figure 6:
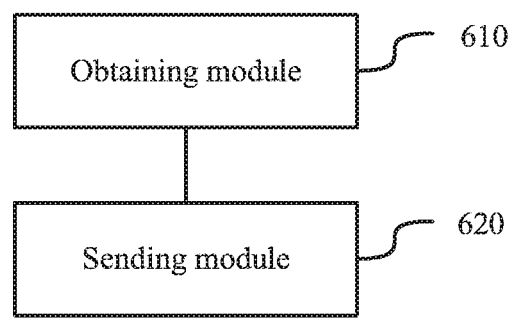
FIG. 6 is a schematic structural diagram of an MME according to an embodiment of the present invention.

This embodiment of the present invention further provides an MME, where the MME is configured to execute operations of the first MME in Embodiment 2. As shown in FIG. 6, the MME includes: an obtaining module 610, configured to obtain a second base station identity of a second base station that provides a service for a second terminal; and a sending module 620, configured to send second base station identity information to a first base station, so that the first base station establishes a transmission channel between the first base station and the second base station corresponding to the second base station identity, where the transmission channel is used by the first base station to send data to the second base station when receiving the data to be sent from a first terminal to the second terminal.

Optionally, the MME further includes a receiving module, configured to receive second base station identity information that is sent, by using an IMS server, by a second MME that provides a service for the second terminal; and the obtaining module 610 is specifically configured to obtain the second base station identity from the second base station identity information.

Optionally, the MME further includes a receiving module, configured to receive GUTI information that is sent, by using an IMS server, by a second MME that provides a service for the second terminal; the sending module 620 is further configured to send an information obtaining request to the second MME corresponding to the GUTI information; the receiving module is further configured to receive second base station identity information sent by the second MME; and the obtaining module 610 is specifically configured to obtain the second base station identity from the second base station identity information.

In this embodiment of the present invention, a first MME may obtain a second base station identity of a second base station that provides a service for a second terminal, and sends the second base station identity to a first base station. Therefore, when receiving the second base station identity sent by the first MME, the first base station establishes a transmission channel between the first base station and the second base station. When receiving data sent by a first terminal, the first base station may directly transmit the data to the second terminal over the transmission channel, and does not need to transmit the data by using a core network (S-GW and P-GW) anymore. Therefore, Delay impact on communication between terminals is reduced.

It should be noted that, when the communication apparatuses provided in the foregoing embodiments perform communication, description is given only using division of the foregoing function modules. In practice, the functions may be allocated to different function modules for implementation as required. To be specific, an internal structure of the device is divided into different function modules to implement all or a part of the functions described above. In addition, the communication apparatuses and communication method embodiments provided in the foregoing embodiments pertain to a same concept. For a specific implementation process, reference may be made to the method embodiments, and details are not described herein.

Embodiment 5

This embodiment of the present invention further provides a communication system, where the system includes a first terminal, a second terminal, a first base station, a second base station, and a first MME. The first base station is configured to execute operations of the first base station in Embodiment 1, and the first MME is configured to execute operations of the first MME in Embodiment 2.

The first base station is configured to: receive a communication request sent by the first terminal, and send the communication request to an IMS server; receive second base station identity information sent by the first MME, and establish a data transmission channel between the first base station and the second base station corresponding to a second base station identity in the second base station identity information; and when receiving communication data that the first terminal sends to the second terminal, send the communication data to the second base station over the data transmission channel, so that the second base station sends the communication data to the second terminal.

The first MME is configured to obtain the second base station identity of the second base station to which the second terminal is attached; and send the second base station identity information to the first base station.

The first base station is further configured to: broadcast a path detection message that carries the second base station identity to a neighboring base station; receive a response message sent by the neighboring base station, and determine a transmission path to the second base station according to the response message, where the response message carries link quality information of a channel and/or information about a total hop count of a link from the first base station to the second base station; and establish the transmission channel between the first base station and the second base station based on the determined transmission path.

Optionally, the transmission channel is a public transmission channel or a dedicated transmission channel.

The first base station is further configured to: if the transmission channel is a public transmission channel, send the data to the second base station over the transmission channel, so that the second base station sends the data to the second terminal; or if the transmission channel is a dedicated transmission channel, obtain a channel identifier of the transmission channel, and send the data to the second base station over the transmission channel corresponding to the channel identifier, so that the second base station sends the data to the second terminal.

The first MME is further configured to: receive the second base station identity information that is sent, by using the IMS server, by a second MME that provides a service for the second terminal.

The first MME is further configured to: receive GUTI information that is sent, by using the IMS server, by a second MME that provides a service for the second terminal, and send an information obtaining request to the second MME corresponding to the GUTI information; and receive the second base station identity information sent by the second MME.

In this embodiment of the present invention, a first MME may obtain a second base station identity of a second base station that provides a service for a second terminal, and sends the second base station identity to a first base station. Therefore, when receiving the second base station identity sent by the first MME, the first base station establishes a transmission channel between the first base station and the second base station. When receiving data sent by a first terminal, the first base station may directly transmit the data to the second terminal over the transmission channel, and does not need to transmit the data by using a core network (S-GW and P-GW) anymore. Therefore, Delay impact on communication between terminals is reduced.

Embodiment 6

Figure 7:
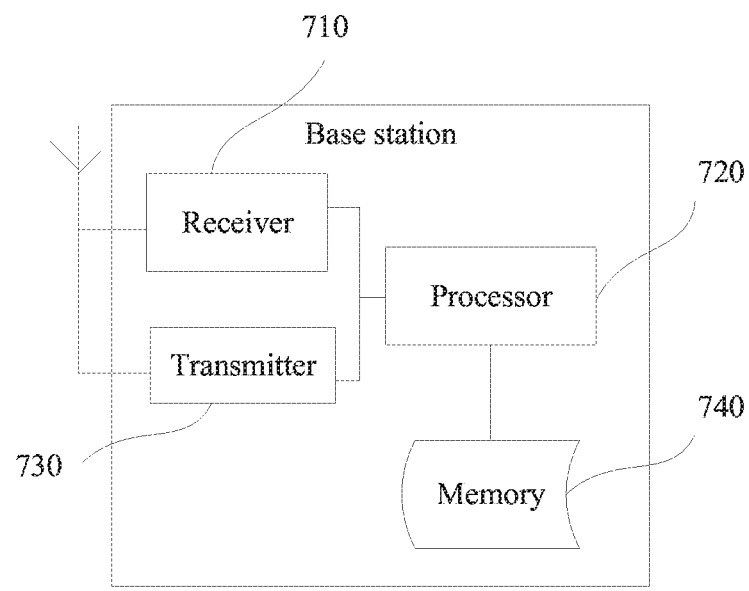
FIG. 7 is a schematic structural diagram of a base station according to an embodiment of the present invention.

Referring to FIG. 7, FIG. 7 shows a schematic structural diagram of a base station related to this embodiment of the present invention, where the base station may be configured to implement the communication method provided in the foregoing embodiment.

Specifically, a first base station includes: a receiver 710, a processor 720, a transmitter 730, and a memory 740, where the receiver 710, the transmitter 730, and the memory 740 are separately connected to the processor 720.

The receiver 710 is configured to receive second base station identity information sent by a first MME; the processor 720 is configured to establish a data transmission channel between the base station and a second base station corresponding to a second base station identity in the second base station identity information; the receiver 710 is further configured to receive data to be sent from a first terminal to a second terminal; and the transmitter 730 is configured to send the data to the second base station over the transmission channel, so that the second base station sends the data to the second terminal.

Optionally, the transmitter 730 is further configured to broadcast a path detection message that carries the second base station identity to a neighboring base station; the receiver 710 is further configured to receive a response message sent by the neighboring base station, and determine a transmission path to the second base station according to the response message, where the response message carries link quality information of a channel and/or information about a total hop count of a link from the first base station to the second base station; and the processor 720 is specifically configured to establish the transmission channel between the base station and the second base station based on the determined transmission path.

Optionally, the transmission channel is a public transmission channel or a dedicated transmission channel.

The transmitter 730 is specifically configured to: if the transmission channel is a public transmission channel, send the data to the second base station over the transmission channel, so that the second base station sends the data to the second terminal; or if the transmission channel is a dedicated transmission channel, obtain a channel identifier of the transmission channel, where the channel identifier is used by the first base station to send data to the second base station over the transmission channel corresponding to the channel identifier when receiving the data that the first terminal sends to the second terminal, so that the second base station sends the data to the second terminal.

In this embodiment of the present invention, when receiving a second base station identity sent by a first MME, a first base station establishes a transmission channel between the first base station and a second base station. When receiving data sent by a first terminal, the first base station may directly transmit the data to a second terminal over the transmission channel, and does not need to transmit the data by using a core network (S-GW and P-GW) anymore. Therefore, Delay impact on communication between terminals is reduced.

Embodiment 7

Figure 8:
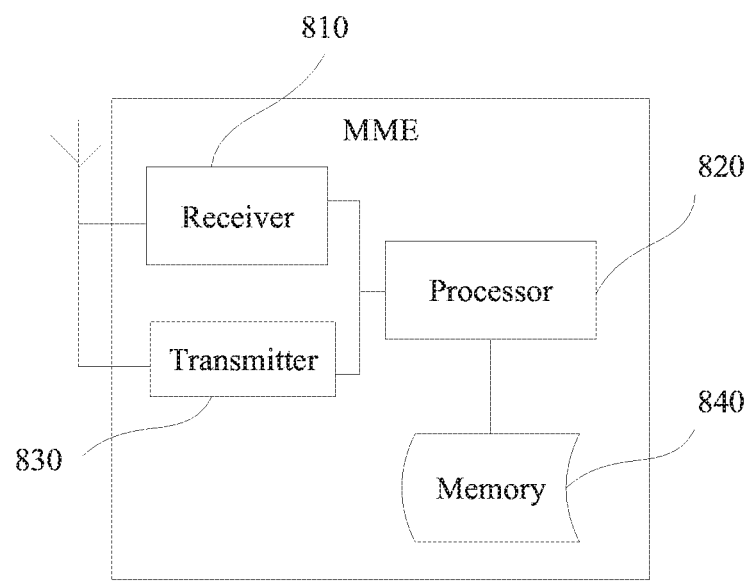
FIG. 8 is a schematic structural diagram of an MME according to an embodiment of the present invention.

Referring to FIG. 8, FIG. 8 shows a schematic structural diagram of an MME related to this embodiment of the present invention, where the MME may be configured to implement the communication method provided in the foregoing embodiment.

Specifically, a first MME includes a receiver 810, a processor 820, a transmitter 830, and a memory 840, where the receiver 810, the transmitter 830, and the memory 840 are separately connected to the processor 820.

The processor 820 is configured to obtain a second base station identity of a second base station that provides a service for a second terminal; and the transmitter 830 is configured to send the second base station identity to a first base station, so that the first base station establishes a transmission channel between the first base station and the second base station corresponding to the second base station identity, where the transmission channel is used by the first base station to send data to the second base station when receiving the data to be sent from a first terminal to the second terminal.

Optionally, the receiver 810 is configured to receive second base station identity information that is sent, by using an IMS server, by a second MME that provides a service for the second terminal; and the processor 820 is specifically configured to obtain the second base station identity from the second base station identity information.

Optionally, the receiver 810 is configured to receive GUTI information that is sent, by using an IMS server, by a second MME that provides a service for the second terminal; the transmitter 830 is further configured to send an information obtaining request to the second MME corresponding to the GUTI information; the receiver 810 is further configured to receive second base station identity information sent by the second MME; and the processor 820 is specifically configured to obtain the second base station identity from the second base station identity information.

In this embodiment of the present invention, a first MME may obtain a second base station identity of a second base station that provides a service for a second terminal, and sends the second base station identity to a first base station. Therefore, when receiving the second base station identity sent by the first MME, the first base station establishes a transmission channel between the first base station and the second base station. When receiving data sent by a first terminal, the first base station may directly transmit the data to the second terminal over the transmission channel, and does not need to transmit the data by using a core network (S-GW and P-GW) anymore. Therefore, Delay impact on communication between terminals is reduced.

Persons of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present invention, but are not intended to limit the present embodiments. Any modification, equivalent replacement, and improvement made without departing from the spirit and principle of the present embodiments shall fall within the protection scope of the present embodiments.

What is claimed is:

1. A method comprising:
    receiving, by a first base station from a core network device, a second base station identity of a second base station, in response to a determination that a first terminal can communicate directly with a second terminal;
    establishing a transmission channel between the first base station and the second base station;
    receiving, by the first base station from the first terminal, bearer data; and
    sending, by the first base station to the second base station, the bearer data over the transmission channel, wherein the bearer data is to be sent from the second base station to the second terminal.

2. The method according to claim 1, further comprising sending, by the second base station, the bearer data to the second terminal.

3. The method according to claim 1, wherein establishing the transmission channel between the first base station and the second base station comprises:
    broadcasting, by the first base station, a path detection message that carries the second base station identity to a neighboring base station;
    receiving, by the first base station, a response message sent by the neighboring base station;
    determining a transmission path to the second base station according to the response message; and
    establishing, by the first base station, the transmission channel between the first base station and the second base station based on the determined transmission path.

4. The method according to claim 3, wherein the response message carries link quality information of a channel.

5. The method according to claim 3, wherein the response message carries information about a total hop count of a link from the first base station to the second base station.

6. The method according to claim 3, wherein the response message carries both link quality information of a channel and information about a total hop count of a link from the first base station to the second base station.

7. The method according to claim 1, wherein sending the bearer data to the second base station over the transmission channel comprises sending the bearer data to the second base station over the transmission channel in response to the transmission channel being a public transmission channel.

8. The method according to claim 1, wherein sending, by the first base station, the bearer data to the second base station over the transmission channel comprises:
obtaining, by the first base station, a channel identifier of the transmission channel, in response to the transmission channel being a dedicated transmission channel; and
sending the bearer data to the second base station over the transmission channel corresponding to the channel identifier.

9. A method comprising:
obtaining, by a first core network device, a second base station identity of a second base station, in response to a determination that a first terminal can communicate directly with a second terminal, wherein the second base station provides a service for the second terminal; and
sending, by the first core network device, the second base station identity to a first base station, wherein a transmission channel is established between the first base station and the second base station corresponding to the second base station identity and the transmission channel is usable by the first base station to send bearer data to the second base station when receiving the bearer data to be sent from the first terminal to the second terminal.

10. The method according to claim 9, further comprising sending, by the second base station, the bearer data to the second terminal.

11. The method according to claim 9, wherein obtaining the second base station identity of the second base station comprises receiving, by the first core network device, second base station identity information that is sent, using an Internet protocol multimedia subsystem (IMS) server, by a second core network device that provides the service for the second terminal.

12. The method according to claim 9, wherein obtaining the second base station identity of the second base station comprises:
receiving, by the first core network device, globally unique temporary identity (GUTI) information that is sent by a second core network device using an Internet protocol multimedia subsystem (IMS) server, wherein the second core network device provides the service for the second terminal;
sending an information obtaining request to the second core network device corresponding to the GUTI information; and
receiving, by the first core network device, second base station identity information sent by the second core network device.

13. A base station comprising:
a processor; and
a non-transitory computer readable storage medium storing a program for execution by the processor, the program including instructions to:
receive, from a core network device, a second base station identity of a second base station, in response to a determination that a first terminal can communicate directly with a second terminal;
establish a transmission channel between the base station and the second base station;
receive bearer data from the first terminal; and
send, to the second base station, the bearer data over the transmission channel, wherein the bearer data is to be sent from the second base station to the second terminal.

14. The base station according to claim 13, wherein the instructions further comprise instructions to:
broadcast a path detection message that carries the second base station identity to a neighboring base station;
receive a response message sent by the neighboring base station;
determine a transmission path to the second base station according to the response message, wherein the response message carries link quality information of a channel or information about a total hop count of a link from the base station to the second base station; and
establish the transmission channel between the base station and the second base station based on the determined transmission path.

15. The base station according to claim 13, wherein the instructions further comprise instructions to send the bearer data to the second base station over the transmission channel in response to the transmission channel being a public transmission channel.

16. The base station according to claim 13, wherein the instructions further comprise instructions to:
obtain a channel identifier of the transmission channel, in response to the transmission channel being a dedicated transmission channel; and
send the bearer data to the second base station over the transmission channel corresponding to the channel identifier.

17. A core network device comprising:
a processor; and
a non-transitory computer readable storage medium storing a program for execution by the processor, the program including instructions to:
obtain a second base station identity of a second base station that provides a service for a second terminal, in response to a determination that a first terminal can communicate directly with the second terminal; and
send the second base station identity to a first base station, wherein a transmission channel is established between the first base station and the second base station corresponding to the second base station identity and the transmission channel is useable by the first base station to send bearer data to the second base station when receiving the bearer data to be sent from the first terminal to the second terminal.

18. The core network device according to claim 17, wherein the instructions further comprise instructions to:
receive second base station identity information that is sent by a second core network device using an Internet protocol multimedia subsystem (IMS) server, wherein the second core network device provides the service for the second terminal; and
obtain the second base station identity from the second base station identity information.

19. The core network device according to claim 17, wherein the instructions further comprise instructions to:
receive globally unique temporary identity (GUTI) information that is sent by a second core network device using an Internet protocol multimedia subsystem (IMS)

server, wherein the second core network device provides the service for the second terminal;
send an information obtaining request to the second core network device, corresponding to the GUTI information;
receive second base station identity information sent by the second core network device; and
obtain the second base station identity from the second base station identity information.

* * * * *